US011671827B2

(12) United States Patent
Moton, Jr. et al.

(10) Patent No.: US 11,671,827 B2
(45) Date of Patent: Jun. 6, 2023

(54) ENVIRONMENTAL TASK-BASED AUTHENTICATION

(71) Applicant: AT&T Intellectual Property I, L.P., Atlanta, GA (US)

(72) Inventors: Robert T. Moton, Jr., Alpharetta, GA (US); Adrianne Binh Luu, Atlanta, GA (US); James Pratt, Round Rock, TX (US); Barrett Kreiner, Woodstock, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 62 days.

(21) Appl. No.: 17/326,931

(22) Filed: May 21, 2021

(65) Prior Publication Data
US 2022/0377542 A1 Nov. 24, 2022

(51) Int. Cl.
*H04W 12/06* (2021.01)
*H04W 4/38* (2018.01)
*H04W 12/63* (2021.01)
*H04W 12/68* (2021.01)

(52) U.S. Cl.
CPC ............ *H04W 12/06* (2013.01); *H04W 4/38* (2018.02); *H04W 12/63* (2021.01); *H04W 12/68* (2021.01)

(58) Field of Classification Search
CPC ....... H04W 12/06; H04W 4/38; H04W 12/63; H04W 12/68; H04W 12/009; H04W 12/65; H04L 63/0861
See application file for complete search history.

(56) References Cited

U.S. PATENT DOCUMENTS

| 8,984,622 | B1 | 3/2015 | Baldwin et al. |
| 10,574,650 | B2 * | 2/2020 | Wallace ................. G06V 40/70 |
| 10,885,168 | B2 * | 1/2021 | Braundmeier .......... H04L 63/20 |
| 11,113,514 | B2 | 9/2021 | Zhang et al. |

(Continued)

OTHER PUBLICATIONS

Sampangi, R.V., et al., "(Can't Lie to ME: Using Micro Expressions for User Authentication", Computer Science, 2014, 2 pages.

(Continued)

*Primary Examiner* — Brandon J Miller

(57) ABSTRACT

A processing system may detect a physical location of a user via at least one mobile computing device of the user, where the user is to be authenticated for a network-based transaction, identify at least one network-connected sensor device at the physical location, and determine, from the at least one network-connected sensor device, a set of environmental conditions of an environment of the physical location. The processing system may next identify at least one action for the user to perform to interact with at least one aspect of the environment in accordance with the set of environmental conditions and transmit an instruction to the user to perform the at least one action. The processing system may then obtain sensor data from the at least one network-connected sensor device, determine, from the sensor data, that the user performed the at least one action, and authenticate the user for the network-based transaction.

20 Claims, 4 Drawing Sheets

(56) References Cited

U.S. PATENT DOCUMENTS

| | | | |
|---|---|---|---|
| 11,303,631 B1* | 4/2022 | Alexanian | G06F 21/32 |
| 2020/0204541 A1* | 6/2020 | Nair | H04L 63/0853 |
| 2020/0213300 A1* | 7/2020 | Edwards | G06Q 20/206 |
| 2021/0358251 A1* | 11/2021 | MacLean | G07C 9/37 |

OTHER PUBLICATIONS

Fong, S. et al., "A biometric authentication model using hand gesture images", BioMedical Engineering Online 2013, 12:111, 18 pages.

* cited by examiner

FIG. 2

USER RECORD 210

USER NAME
USER IDENTIFYING DATA
PHONE ADDRESS
SMARTWATCH ADDRESS
CURRENT/LAST LOCATION

USER BIOMETRIC DATA

PULSE
BLOOD OXYGEN
SKIN CONDUCTANCE

ENVIRONMENT MAP 220

LATITUDE       40.08609712
LONGITUDE      -105.939459712
ALTITUDE       7935.1234
TEMPERATURE    56 F
OTHER PEOPLE MOTION    N
SENSED NEARBY

SMARTPHONE CAMERA IMAGE

NETWORK
CONNECTED
DEVICES

THERMOSTAT
SECURITY CAMERA
LIGHTING SYSTEM

NON-
NETWORK
OBJECTS

TREE
ROLLING SUITCASE
PUMPKIN

SECURITY CAMERA IMAGE

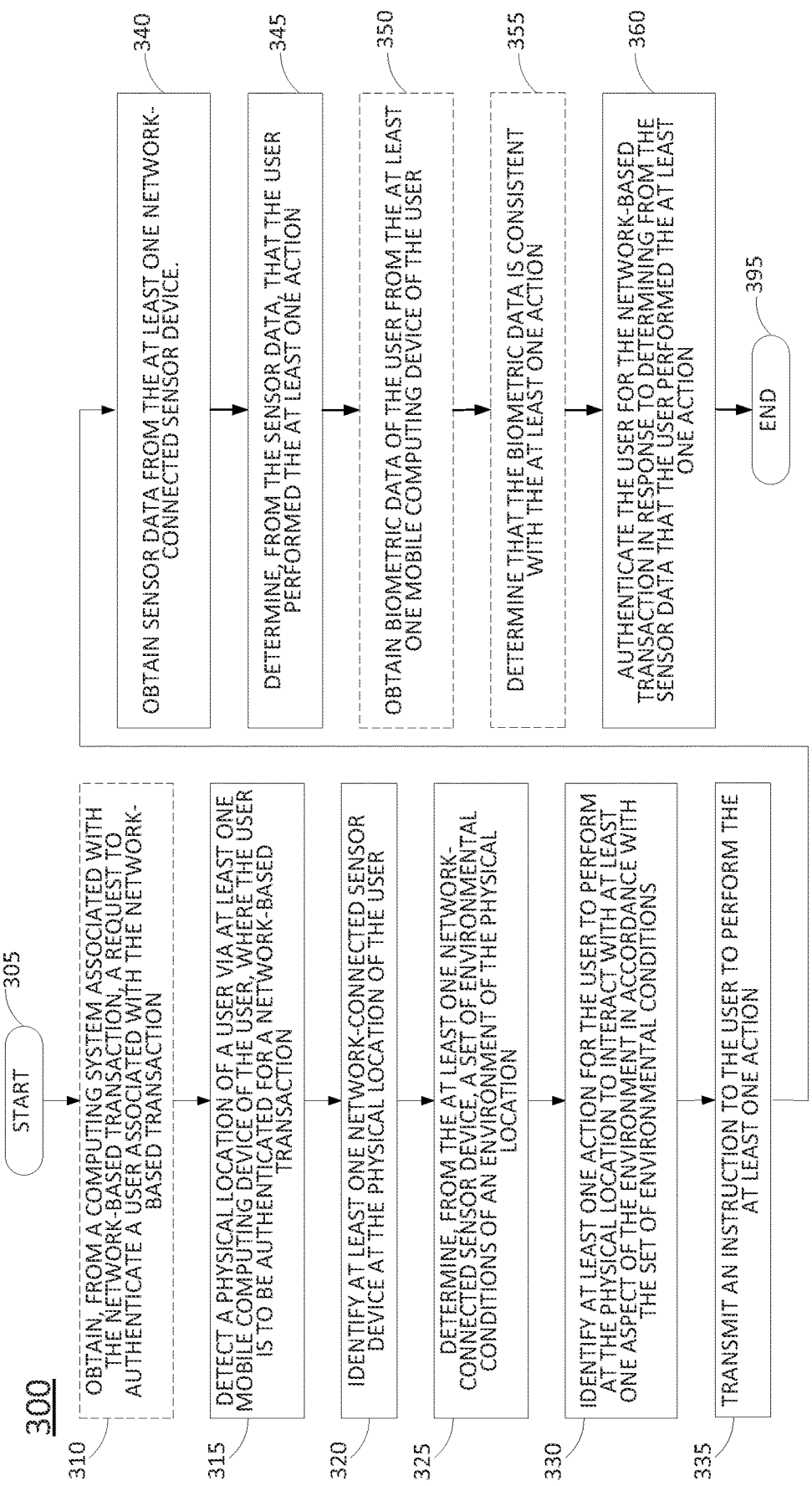

ENVIRONMENTAL TASK-BASED AUTHENTICATION

The present disclosure relates to network authentication of users, and more particularly to methods, non-transitory computer-readable media, and apparatuses for authenticating a user for a network-based transaction by determining from sensor data from at least one network-connected sensor device at a physical location a change in a set of environmental conditions of the physical location indicative that the user performed at least one action in accordance with an instruction.

BACKGROUND

User authentication is applied with respect to a diverse array of network-based transactions, such as for online account access, authorizing use of a credit cards, and so forth. In many cases, user authentication may comprise requiring a user to enter a username and a password. However, usernames, passwords, and username/password sets are often guessed, stolen, or otherwise compromised. Thus, for many more sensitive network-based transactions, such as online banking, accessing an account with an online merchant, etc., a two-factor authentication is increasingly prevalent. For instance, in addition to a username and password, a user may be sent a one-time passcode via email or text message that must also be entered, e.g., via an application (app) or field of a webpage. While these methods may add further protection, there are instances where the two-factor authentication has also been breached, such as via SIM (subscriber identity module) hacking, or where an email address used for two-factor authentication has itself been compromised.

SUMMARY

Methods, computer-readable media, and apparatuses for authenticating a user for a network-based transaction by determining from sensor data from at least one network-connected sensor device at a physical location a change in a set of environmental conditions of the physical location indicative that the user performed at least one action in accordance with an instruction are disclosed. For example, a processing system including at least one processor may detect a physical location of a user via at least one mobile computing device of the user, where the user is to be authenticated for a network-based transaction, identify at least one network-connected sensor device at the physical location of the user, and determine, from the at least one network-connected sensor device, a set of environmental conditions of an environment of the physical location. The processing system may next identify at least one action for the user to perform at the physical location to interact with at least one aspect of the environment in accordance with the set of environmental conditions and transmit an instruction to the user to perform the at least one action. The processing system may then obtain sensor data from the at least one network-connected sensor device, determine, from the sensor data, that the user performed the at least one action, and authenticate the user for the network-based transaction in response to determining from the sensor data that the user performed the at least one action.

BRIEF DESCRIPTION OF THE DRAWINGS

The teaching of the present disclosure can be readily understood by considering the following detailed description in conjunction with the accompanying drawings, in which:

FIG. 2 illustrates an example of a user record and an environment map, in accordance with the present disclosure;

FIG. 3 illustrates a flowchart of an example method for authenticating a user for a network-based transaction by determining from sensor data from at least one network-connected sensor device at a physical location a change in a set of environmental conditions of the physical location indicative that the user performed at least one action in accordance with an instruction.

To facilitate understanding, identical reference numerals have been used, where possible, to designate identical elements that are common to the figures.

DETAILED DESCRIPTION

Figure 1:
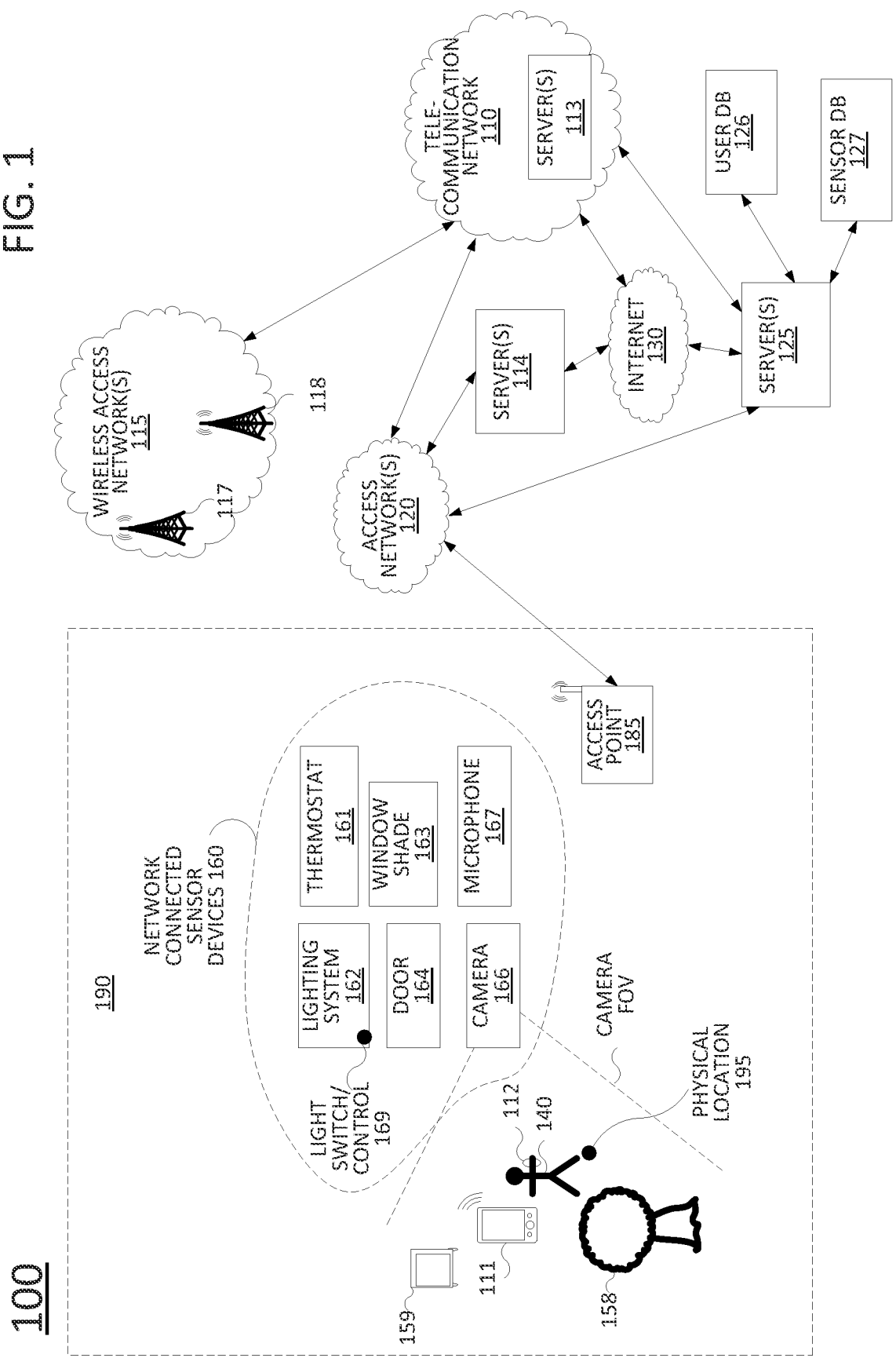
FIG. 1 illustrates an example network or system related to the present disclosure.

Methods, computer-readable media, and apparatuses for authenticating a user for a network-based transaction by determining from sensor data from at least one network-connected sensor device at a physical location a change in a set of environmental conditions of the physical location indicative that the user performed at least one action in accordance with an instruction are disclosed. In particular, examples of the present disclosure provide for authentication of a user in connection with a network-based transaction via a processing system that commands the user to perform a task within the user's physical environment, with network-connected sensor based confirmation that the task was performed. The transaction may be any electronic exchange of information that results in a financial transaction, a purchase, access to a physical or electronic asset, and others. The transaction may have been requested by the user or the user may be authenticating the request on behalf of another party.

The user may carry one or more electronic communication devices, such as a wireless phone, an electronic virtual assistant, a wearable computing device, such as a smartwatch, and implanted or temporarily attached electronics, such as an electronically-enabled temporary tattoo. Each of these devices may include biometric sensors, such as a camera, a microphone, a temperature sensor, a pulse oximeter, etc., or other sensors, such as a gyroscope, a compass, an accelerometer, etc. In addition, in the user's physical environment, there may exist one or more proximate sensors that may be connected to a network, such as the Internet. These network-connected sensors, or sensor devices may include motion sensors, cameras, microphones, thermostats, and so forth. In addition, such network-connected sensor devices may be fixed or mobile, such as those that are attached to a vehicle (e.g., a drone, autonomous vehicle, or vehicle capable of autonomous operation, and/or a remotely controllable vehicle, e.g., controllable by a processing system of the present disclosure to move to a particular position to capture sensor data, etc.).

In one example, a processing system of the present disclosure, e.g., an authentication server, may receive a request to authenticate a user in connection with an electronic, network-based transaction. The request may be received from a device of the user, or from another entity associated with the transaction (e.g., a merchant, a website, a network operator, etc.). For instance, the user may have subscribed to a recurring monthly purchase of a household item and the user may request that each month's purchase be authenticated. This is one example, but the present disclosure may equally apply to any of a number of electronic, network-based transaction authentication needs.

When the authentication server receives the request for an authentication to be performed, it may begin an authentication process by creating an environmental map of the user's current (time $t_1$) environment. In one example, the authentication server may maintain a user record, e.g., in an authentication database user. The user record may include the user's name, identifying data, and electronic addresses of one or more mobile computing devices of the user. In one example, the authentication server may determine a physical location of the user by querying for location information relating to the electronic address(es) of the user's mobile computing device(s). For instance, the authentication server may provide an authentication service by a telecommunication network service provider, wherein the telecommunication network service provider is able to track the location of the user's network-connected mobile computing devices, and wherein the user has consented to the location tracking (e.g., affirmatively opt-in to the service) for purposes of authentication and/or for other network services. Alternatively, or in addition, the authentication server may be authorized by the user to obtain the user's location information from a telecommunication network service provider or another entity that has been permitted by the user to collect and/or maintain such location data (e.g., an application (app) provider of an app installed on a user's smartphone that is able to access the user device's Global Positioning System (GPS) location data, and so forth).

Thus, the authentication server may use location data from one or multiple sources to identify the location of the user and to then identify network-connected sensor devices at the user's physical location, e.g., at time $t_1$. For instance, this may be accomplished by comparing the location data for the user with locations (e.g., geographic coordinates) of proximate sensors that may have been previously recorded and stored as being accessible for use in performing authentications. The authentication server may therefore create a list of unique available network-connected sensor devices that may be used in the authentication process at time $t_1$. In one example, each of the network-connected sensor devices may have an associated electronic address which may be used by the authentication server to communicate via one or more networks with the respective network-connected sensor devices. For instance, the authentication server may send a request for each available network-connected sensor device to provide to the authentication server a description of the sensor data collected by such network-connected sensor device, and that may be used to create a map of the environmental conditions of the physical environment. For instance, the map may include identifications of available network connected sensor devices, the available sensor data of such devices, the current settings of controllable network connected sensor devices, the temperature, air pressure, light level, sound level, or the like with respect to the environment, detected non-networked objects in the environment, and so forth.

The authentication server may analyze the environment map data collected to identify one or more tasks for the user to perform within the environment (e.g., to interact with at least one aspect of environment) in order for the authentication to be completed. For instance, the authentication server may transmit an instruction to the user via the at least one mobile computing device of the user to interact with at least one aspect of the environment. For instance, the available network-connected sensor devices may include a camera that captures one or more images (and/or video), which may be analyzed by the authentication server to identify one or more visible objects. In an illustrative example, the authentication server may identify that the image(s) include a pumpkin that appears to be behind the user. In such case, the authentication server may create and transmit a command to the user, such as: "to authenticate, move the orange pumpkin behind you." A new image, or images, may be captured via the camera with the pumpkin moved at time $t_2$ and forwarded to the authentication server, which may analyze the image(s) to determine that the item is no longer visible or is detected to be in a different location. In this case, the authentication server may determine that the task has been completed in accordance with the command, and may provide a positive response to one or more entities associated with the authentication request (e.g., the user and/or another participating entity to the network-based transaction to be authenticated).

In another example, if the user is at home, the detected available network-connected sensor devices may include a thermostat. In such case, the authentication server may determine a task/action for the user and transmit a command for the user to perform the task/action such as: "to authenticate, set the thermostat to 72 degrees." In still another example, the authentication server may identify, via the mapping, an additional network-connected sensor devices that do not necessarily measure externalities of the environment, but which can report their own statuses/settings, such as a light switch, a fan, an appliance (e.g., a home appliance or kitchen appliance such as a refrigerator, a stove, a microwave oven, an oven, a washer, a dryer, a mixer, or a blender), and so forth. In such case, the authentication server may command the user to flip the switch to turn one or more lights on or off, to change the fan setting (higher, lower, off, on, etc.), or the like. Thus, it should be noted that the user can be directed to interact with networked sensor devices, or non-networked aspect of environment. For example, the authentication server may analyze an image from a camera of a mobile computing device of the user to detect a distinct item within the image to be used to perform the authentication. For instance, the authentication server may detect the existence of letters in a sign in the user's environment and construct a command such as: "to authenticate, send a photo of the second "E" in the sign behind you." In one example, the command may be received on the user's mobile computing device, and the user may respond with a photo of the requested action.

As another example, the command may be: "to authenticate, walk 10 feet to your right and wave at the security camera." The authentication server may send a new request to security camera XYZ at time $t_2$ and compare what it receives with the expected results to authenticate. Depending on the sensor data available, other commands may be generated and the tasks, or actions may be recorded as being satisfied by results being sent by one or more of the network-connected sensor devices to the authentication server. Using these techniques, other commands may be devised such as: "hum the happy birthday tune" into a nearby microphone, "tap your phone 5 times" in front of a nearby security camera, "repeat this phrase 'xxxxxx'" into a nearby microphone," "perform any physical action" on a nearby floor mat with a tactile sensor, and so on.

Examples of the present disclosure may also provide a two-factor authentication. For instance, if the user's facial mapping (e.g., an eigneface, or the like) and voice print are stored in the user record, a command such as "smile and show a thumbs-up to the camera" may be used. The user may present himself or herself to the camera smiling with a thumbs-up gesture for the camera to send to the authentication server. The authentication server may analyze the image for gesture, expression, and identity match. The authentication server may also analyze the image's metadata to confirm that the image was taken at time $t_1$. Similarly, the response to a command to repeat a phrase may be captured via a microphone, sent to the authentication server, and analyzed to confirm that the phrase is correct and that the voice matches the user's voiceprint.

Examples of the present disclosure may enable the user to authenticate the user's own transaction, or on behalf of another party. For instance, the user may be a parent, a supervisor, etc., where the transaction may be a credit card purchase being performed by a child, a subordinate employee, etc. The details of the transaction may therefore be included in the authentication command, such as "Touch the lamp post nearby to approve Suzie's $25.89 purchase at Retailer 1" or "Show your phone screen to the drone overhead to approve Jim's business deal." These and other aspects of the present disclosure are discussed in greater detail below in connection with the examples of FIGS. 1-4.

To aid in understanding the present disclosure, FIG. 1 illustrates an example system 100, related to the present disclosure. As shown in FIG. 1, the system 100 connects user device 111, biometric sensor(s) 112, server(s) 113, server(s) 114, server(s) 125, access point 185, network connected sensor devices 160, and so forth with one another and with various other devices via a core network, e.g., a telecommunication network 110, a wireless access network 115 (e.g., a cellular network), and Internet 130.

Figure 4:
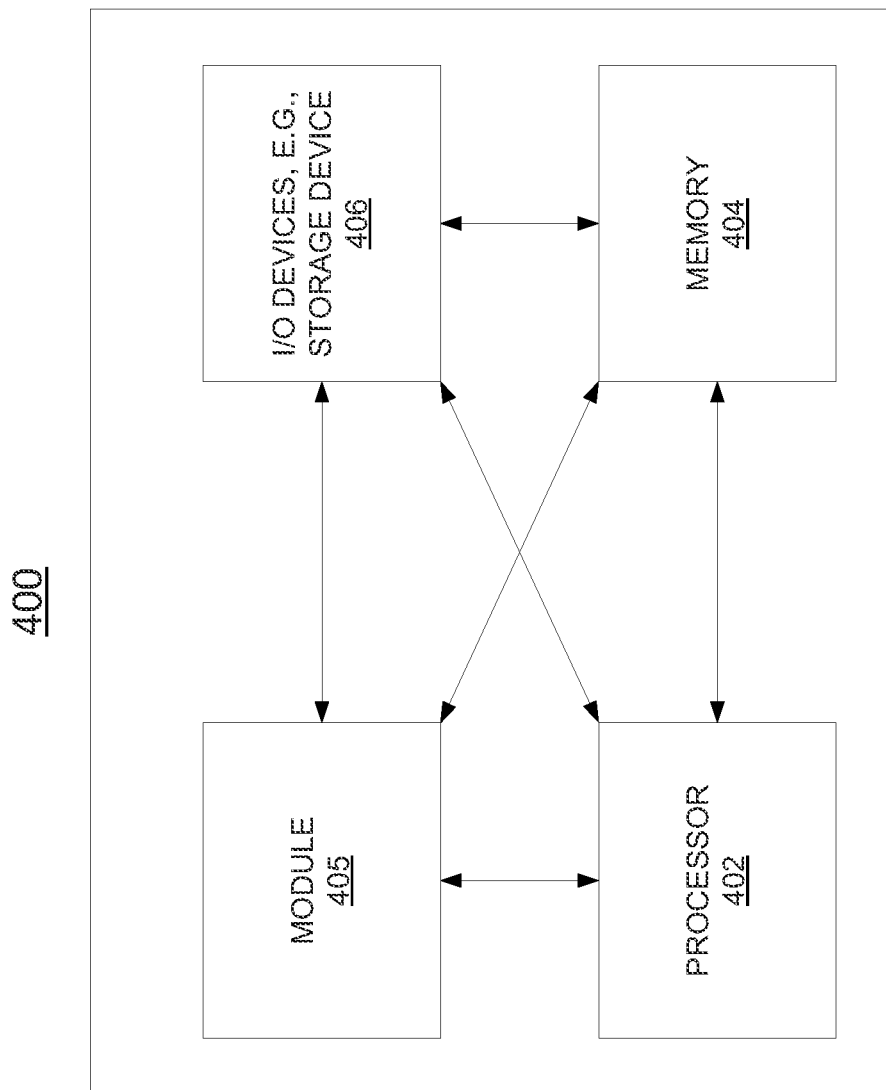
FIG. 4 illustrates a high-level block diagram of a computing device specially programmed to perform the functions described herein.

In one example, the server(s) 125 may each comprise a computing device or processing system, such as computing system 400 depicted in FIG. 4, and may be configured to perform one or more steps, functions, or operations in connection with examples of the present disclosure for authenticating a user for a network-based transaction by determining from sensor data from at least one network-connected sensor device at a physical location a change in a set of environmental conditions of the physical location indicative that the user performed at least one action in accordance with an instruction. For instance, an example method for authenticating a user for a network-based transaction by determining from sensor data from at least one network-connected sensor device at a physical location a change in a set of environmental conditions of the physical location indicative that the user performed at least one action in accordance with an instruction is illustrated in FIG. 3 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, server(s) 125 may comprise, or be coupled to or in communication with a user database (DB) 126 and a sensor database (DB) 127. For instance, the server(s) 113, or server(s) 125 in conjunction with user database (DB) 126 and a sensor database (DB) 127 may comprise a network-based transaction authentication system in accordance with the present disclosure. In one example, each of the user database (DB) 126 and sensor database (DB) 127 may represent one or more distributed file systems, e.g., a Hadoop® Distributed File System (HDFS™), or the like. Server(s) 125 may receive and store information regarding available network connected sensor devices 160, such as the device locations, the sensor data available (for sensor devices of the network connected sensor devices 160), locally controllable settings of such network connected devices (if any), and so forth in sensor database 127. Similarly, server(s) 125 may receive and store information regarding users, user devices, biometric sensor(s) of such users, user locations, and so forth in user database 126.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include one or more servers 113. In one example, each of the server(s) 113 may comprise a computing device or processing system, such as computing system 400 depicted in FIG. 4 and may be configured to provide one or more functions in connection with examples of the present disclosure for authenticating a user for a network-based transaction by determining from sensor data from at least one network-connected sensor device at a physical location a change in a set of environmental conditions of the physical location indicative that the user performed at least one action in accordance with an instruction (e.g., in accordance with the example method 300 of FIG. 3, and as described in greater detail below). In one example, server(s) 113 may perform the same or similar functions as server(s) 125. For instance, telecommunication network 110 may provide a network-based transaction authentication system, e.g., as a service to one or more subscribers/customers, in addition to telephony services, data communication services, television services, etc. For ease of illustration, various additional elements of telecommunication network 110 are omitted from FIG. 1.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, user device 111, biometric sensor(s) 112, network connected sensor devices 160, and so forth may be in communication with base stations 117 and 118, which provide connectivity between user device 111, biometric sensor(s) 112, network connected sensor devices 160, and other endpoint devices within the system 100, various network-based devices, such as server(s) 113, server(s) 125, and so forth. In one example, wireless access network(s) 115 may be operated by the same service provider that is operating telecommunication network 110, or one or more other service providers.

As illustrated in FIG. 1, user device 111 may comprise, for example, a cellular telephone, a smartphone, a tablet computing device, a laptop computer, a desktop computer, a wireless enabled wristwatch, or any other wireless and/or cellular-capable mobile telephony and computing devices (broadly, a "mobile device" or "mobile endpoint device"). In one example, user device 111 may be equipped for cellular and non-cellular wireless communication. For instance, user device 111 may include components which support peer-to-peer and/or short range wireless communications, e.g., IEEE 802.11 based communications (e.g., Wi-Fi, Wi-Fi Direct), IEEE 802.15 based communications (e.g., Bluetooth, Bluetooth Low Energy (BLE), and/or ZigBee communications), LTE Direct, Dedicated Short Range Communications (DSRC), e.g., in the 5.9 MHz band, or the like, a 5G device-to-device (D2D) sidelink, such as over a P5 interface, and so forth. For instance, user device 111 may include one or more radio frequency (RF) transceivers, e.g., for cellular communications and/or for non-cellular wireless communications. In one example, user device 111 may comprise a computing device or processing system, such as computing system 400 depicted in FIG. 4, and may be configured to perform one or more steps, functions, or operations in connection with examples of the present disclosure for authenticating a user for a network-based transaction by determining from sensor data from at least one network-connected sensor device at a physical location a change in a set of environmental conditions of the physical location indicative that the user performed at least one action in accordance with an instruction (such as illustrated in FIG. 3 and described below).

In one example, user 140 may further have one or more biometric sensor(s) 112, e.g., a wearable device, that may be in communication with device 111, e.g., via a wired or a wireless connection, such as a via an infrared transmitter or transceiver, a transceiver for Institute for Electrical and Electronics Engineers (IEEE) 802.11 based communications (e.g., "Wi-Fi"), IEEE 802.15 based communications (e.g., "Bluetooth", "ZigBee", etc.), and so forth. Alternatively, or in addition, biometric sensor(s) 112 may connect to various networks independently of a respective mobile device. The biometric sensor(s) 112 may comprise: a heart rate monitor, electrocardiogram device, acoustic sensor, sensor for measuring a breathing rate of user 140, a galvanic skin response (GSR) device, and so forth. In one example, the biometric sensor(s) 112 may measure or capture data regarding various physical parameters of a user (broadly, "biometric data") such as: a heart rate, breathing rate, skin conductance and/or sweat/skin moisture level, temperature, blood pressure, voice pitch and tone, body movements, e.g., eye movements, hand movements, and so forth. In another example, the biometric sensor(s) 112 may measure brain activity, e.g., electrical activity, optical activity, chemical activity, etc., depending upon the type(s) of biometric sensor(s).

In the present example, access point 185 may be associated with a physical location 195, which may comprise, for example, a home of user 140. In one example, access point 185 may communicate with and provide access to access network(s) 120, Internet 130, etc. for user device 111, biometric sensor(s) 112, network connected sensor devices 160, and so forth. For instance, access point 185 may comprise a router, which may be capable of both wired and/or wireless communication. For instance, access point 185 may comprise a wired Ethernet router and/or an IEEE 802.11 (Wi-Fi) router, and may communicate with respective devices at physical location 195 via wired and/or wireless connections. As shown in FIG. 1, network connected sensor devices 160 may include thermostat 161, lighting system 162 (which may include a light switch 169), window shade 163, door 164, camera 166, microphone 167, and so forth. It should also be noted that network-connected sensor devices 160 may have independent network access, such as via Long Term Evolution (LTE) machine type communication (MTC). For instance, LTE-MTC is part of 3GPP Release 13 and provides specifications for multiplexing low bandwidth and/or delay tolerant communications for devices in potentially poor coverage conditions, e.g., over long distances, in indoor or below-grade environments, and so on, with high bandwidth 4G and beyond mobile data. Alternatively or in addition, network-connected sensor devices 160 may have network-connectivity via Narrowband Internet of Things (NB-IoT) other low power wide area network (LPWAN) radio technology, or any other cellular or non-cellular wireless communication modality, such as via a local area network (LAN) (wireless or wired) associated with access point 185, or the like.

In an illustrative example, server(s) 114 may represent a computing system of an entity associated with an online, network-based transaction that requires a user authentication (e.g., authenticating user 140). For instance, server(s) 114 may represent an online banking system that user 140 may be attempting to access, e.g., to view user account information, transfer fund, etc. Similarly, in another example, server(s) 114 may represent a merchant website via which the user 140 is attempting to complete an online purchase. In yet another example, user 140 may be an authorized credit card account holder, and a child, subordinate employee, etc. may be attempting to make a purchase using the credit card. In such case, server(s) 114 may be associated with the merchant or credit card issuer and may seek to authenticate user 140 in order to obtain permission/authorization from user 140 for the transaction to be completed.

In each case, server(s) 114 may transmit an authentication request to server(s) 125 (e.g., a network-based transaction authentication system) to authenticate user 140. User 140 may be identified in any number of ways such as an identifier of user device 111, e.g., a user device identifier (ID). For instance, the user device ID may comprise a phone number of the user device 111 (e.g., a mobile phone). Alternatively, or in addition, the user device ID may comprise an international mobile subscriber identity (IMSI) number, an international mobile equipment identifier (IMEI) number, an IP address, and so forth.

Server(s) 125 may then determine a physical location of user 140, e.g., physical location 195 in the example of FIG. 1. In one example, server(s) 125 may query user device 111 for a current location. In another example, server(s) 125 may obtain the location of user 140 (e.g., the location of user device 111) by requesting from another entity that is in possession of such information and for which the user 140 has consented for such information to be provided to server(s) 125. For instance, server(s) 125 may obtain the location of user device 111 from telecommunication network 110, which may collect and store the location of user device 111 in connection with telecommunication services provided to user device 111. It should be noted that the location(s) of the user 140 may be determined from a location of the user device 111, but may alternatively or additionally be determined in other ways, such as location information of biometric sensor(s) 112, user 140 being "checked-in" at a location, such as accessing a home of user 140 via facial recognition, and so forth.

In any case, after obtaining the physical location 195 of user 140, server(s) 125 may then identify available network connected devices at the physical location 195. For instance, server(s) 125 may look up available network connected devices in sensor database 127 using the physical location 195 as the matching criterion. For instance, network connected device at the physical location or within a threshold distance, radius, geofence, etc. from the physical location may be retrieved via a query of the sensor database 127. In the present example, network connected sensor devices 160 may be identified by server(s) 125. It should be noted that in one example, physical location 195 may be a home of the user 140. However, in other examples, physical location 195 may be anywhere that the user 140 may be detected to be present. Next, server(s) 125 may establish or attempt to establish communication with one or more of the network connected sensor devices 160. Server(s) 125 may also determine, from entries in sensor database 127 or via communication with respective ones of the network connected sensor devices 160, the current availability of such network connected sensor devices 160, the types of sensor data that are collected and that may be accessed by server(s) 125, the types of environmental controls that may be available via the ones of network connected sensor devices 160, and so forth.

In one example, server(s) 125 may also determine a set of current environmental conditions of the physical location 195, or environmental conditions of the environment 190. It should be noted that the environment 190 may include any of the environment surrounding and including a point defining physical location 195 that is quantifiable via sensor data of any of the network connected sensor devices 160. For instance, the environment 190 may include space around physical location 195 that is visible via images obtained via camera 166, space around physical location 195 from which sounds may be captured via microphone 167, etc. Accordingly, server(s) 125 may create a "map" of current environmental conditions from sensor data of various ones of the network connected sensor devices 160. For instance, server(s) 125 may determine a temperature via thermostat 161, a sound level via microphone 167, non-networked objects at the physical location 195/in the environment 190 via images/video from camera 166, and so forth. Similarly, server(s) 125 may determine a humidity from a humidistat (or a moisture sensor that is not also a humidistat for controlling the humidity), may determine temperature from a thermometer (e.g., that is not also a thermostat for controlling the temperature), may determine air pressure from a barometer, and so forth. In one example, the "map," or set of environmental conditions may also include setting of one or more of the network connected sensor devices 160, such as an on/off state of lighting system 162, an open/closed state of door 164, and so forth.

Thereafter, server(s) 125 may then create at least one action/task to direct the user to perform, e.g., to interact with the environment 190 of the physical location 195. As noted above, the at least one action/task may comprise an interaction with one of the network-connected devices, such as changing thermostat 161 to a particular temperature, or increasing or decreasing the temperature by a directed number of degrees, turning the lighting system 162 on or off (or dimmer or brighter) via light switch/control 169. Server(s) 125 may authenticate the user 140 by determining via sensor data from any one or more of the available network connected sensor devices 160 that the task/action is correctly completed. For example, server(s) 125 may determine that the temperature has been correctly set via sensor data from thermostat 161 (e.g., temperature data). Similarly, server(s) 125 may determine that the lighting system 162 has been set correctly via sensor data from the lighting system 162 (e.g., current setting information). In one example, server(s) 125 may alternatively or additionally determine that the lighting system 162 has been set correctly via a separate photodetector, e.g., a light sensor. It should be noted that none of the network-connected devices 160 are traditionally used or are a part of a transaction system such as a point-of-sale device like a credit card reader located at a store. In other words, a user is not traditionally required to interact with such network-connected devices 160 to complete a transaction such as purchasing an item from a commercial establishment.

In one example, the at least one task may comprise interacting with a non-networked aspect of the environment 190. For instance, server(s) 125 may determine from the sensor data from network connected sensor devices 160 (e.g., from images/video captured by camera 166 at time $t_1$) that a tree 158 and a rolling suitcase 159 are present at the physical location 195. For example, server(s) 125 may use one or more object detection/recognition models for identifying unique objects in images/video of camera 166. In such case, server(s) 125 may verify task completion by further image analysis of one or more images obtained from camera 166 at time $t_2$. To illustrate, in order to detect the tree 158 and rolling suitcase 159 in visual information from camera 166, server(s) 125 may store visual information of trees and rolling suitcases as detection models. This may include one or more images of trees and rolling suitcases (e.g., from different angles), and may alternatively or additionally include feature set derived from one or more images of trees and rolling suitcases respectively. For instance, for trees, server(s) 125 may store a respective scale-invariant feature transform (SIFT) model, or a similar reduced feature set derived from image(s) of tree, which may be used for detecting tree 158 in the visual information from camera 166 via feature matching (and similarly for rolling suitcases). Thus, in one example, a feature matching detection algorithm employed by server(s) 125 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, etc.

The visual features used for detection and recognition of tree 158, rolling suitcase 159, and any other types of objects may include low-level invariant image data, such as colors (e.g., RGB (red-green-blue) or CYM (cyan-yellow-magenta) raw data (luminance values) from a CCD/photosensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, the server(s) 125 may perform an image salience detection process, e.g., applying an image salience model and then performing an image recognition algorithm over the "salient" portion of the image(s) or other visual information from camera 166. Thus, in one example, visual features may also include a length to width ratio of an object, a velocity of an object estimated from a sequence of images (e.g., video frames), and so forth. Similarly, in one example, server(s) 125 may apply an object detection and/or edge detection algorithm to identify possible unique items in the visual information from camera 166 (e.g., without particular knowledge of the type of item; for instance, the object/edge detection may identify an object in the shape of a tree in a video frame, without understanding that the object/item is a tree). In this case, visual features may also include the object/item shape, dimensions, and so forth. In such an example, object recognition may then proceed as described above (e.g., with respect to the "salient" portions of the image(s) and/or video(s)).

In one example, the detection of objects and their locations and/or position in the visual data of images/video of camera 166 may be in accordance with one or more q algorithms (MLAs), e.g., one or more trained machine learning models (MLMs). For instance, a machine learning algorithm (MLA), or machine learning model (MLM) trained via a MLA may be for detecting a single object, or may be for detecting a single object from a plurality of possible objects that may be detected via the MLA/MLM. For instance, the MLA (or the trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, a distance-based classifier, e.g., a Euclidean distance-based classifier, or the like, and so on. In one example, the object detection MLM(s) may be trained at a network-based processing system (e.g., server(s) 113, server(s) 125, or the like). It should also be noted that various pre-processing or post-recognition/detection operations may also be applied. For example, server(s) 125 may apply an image salience algorithm, an edge detection algorithm, or the like (e.g., as described above) where the results of these algorithms may include additional, or pre-processed input data for the one or more MLAs. Thus, in the example of FIG. 1, server(s) 125 may apply any number of image pre-processing algorithms to images/video from camera 166, and may apply at least one object detection/recognition MLA to detect tree 158 and rolling suitcase 159 from among various types of detectable objects in accordance with the one or more MLAs applied by and in operation on server(s) 125.

In one example, the at least one task may comprise performing an action to interact with at least one of the available network connected sensor devices 160, where the action can be further verified via a device of the user 140. For instance, the command may be "perform a physical activity until your heart rate reaches 85 beats per minute." Then, server(s) 125 may analyze images/video from camera 166 to determine that user 140 is performing jumping jacks (and to determine when the user 140 stops jumping jacks). The heart rate of user 140 may also be monitored by server(s) 125 obtaining a feed from biometric sensor(s) 112 of heart rate data of user 140 and determining that the user 140 stops jumping jacks when the heart rate of 85 beats per minute is exceeded. As in the preceding examples, server(s) 125 may authenticate user 140 when the task/action is determined to be completed. Server(s) 125 may generate commands for additional actions/task of the same or a similar nature, such any of the examples described above or elsewhere herein. In one example, aspects of the present disclosure may be combined with other authentication techniques. For instance, server(s) 125 may apply facial recognition based authentication to user 140 using images/video from camera 166 in addition to commanding that user 140 perform at least one task/action to interact with the environment 190. Broadly, the present techniques direct user 140 to interact with at least one aspect of the environment 190 and may detect a change in a set of environmental conditions of the physical location 195 and/or environment 190 indicative that the user has successfully and correctly completed the commanded action/task.

In this regard, it should be noted that other tasks/actions may have associated MLMs/MLAs, such as for detecting performance of an action (e.g., jumping jacks, turning around, etc.), detecting speaking of a phrase/utterance, etc. For instance, any available speech recognition system may be used to detect the speaking of a particular phrase or sentence. In addition, such a speech recognition system may also maintain a voice model of the user 140 (e.g., a MLA/MLM that is trained to detect whether a speaker is the user 140, and conversely to correctly identify when a speaker is not the user 140). Similarly, in one example, server(s) 125 may direct user 140 to perform, and may detect non-speech utterances, such as humming a tune, whistling, or the like in accordance with one or more ML-based models, e.g., non-speech utterance detection model(s). For instance, various speech or other audio detection models may be trained from extracted audio features, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Additional models may also be trained for detecting whistles, grunts, clicks, and so forth. In one example, each audio model may comprise a feature vector representative of a particular sound, or a sequence of sounds.

It should be noted that server(s) 125 may provide an authentication result to server(s) 114 (e.g., a positive result for a correct task completion, or a negative result for an incorrect task completion or non-completion). In one example, an authentication result may also be provided to user 140, e.g., by transmitting the result to user device 111. Thus, for instance, for a positive authentication, server(s) 114 may then permit the associated network-based transaction to complete, or to proceed to a next state. It should also be noted that in one example, server(s) 125 may select a particular action/task to command the user to perform via a task selection table and/or a task selection logic. For instance, server(s) 125 may maintain an object/action table that matches available object types with corresponding possible actions. For instance, for an object of "pumpkin," the available actions may include "move," "touch," "lift and return," etc. For an object of "soccer ball," the available actions may include "touch," "lift," "throw," "kick," etc. In one example, to compress storage and/or memory, objects may be grouped into categories having corresponding actions, such as "small non-breakable objects," "small fragile objects," "medium immovable objects," "large immovable objects," and so forth. In one example, a task selection logic may include various rules for selecting among possible actions. For instance, a task selection logic may include rules to direct server(s) 125 to select between using tree 158 and rolling suitcase 159 for the assigned task. In one example, a task selection logic may include rules for selecting among the available actions relating to an object (e.g., to choose among "touch," "kick," "throw," etc.). In addition, in one example, a task selection logic may include rules for selecting additional task requirements (e.g., "move the rolling suitcase to your left" versus "move the rolling suitcase to your right," or "move the rolling suitcase 10 feet to the left," versus "move the rolling suitcase 5 feet to the left"). For instance, each of these types of decisions may comprise a tunable/selectable parameter for the server(s) 125. In one example, server(s) 125 may select among available objects randomly, or semi-randomly according to a least recently used (LRU) weighting.

In one example, the task selection table may include additional weights to cause objects to be more likely or less likely to be selected. For instance, the weights may be populated into the table such that an object of "vase" is less likely to be selected than "ball." For example, an operator of an environmental-based user authentication system of server(s) 125 may determine that it is preferable to more often use objects that are resilient (e.g., less fragile items such as soccer balls), versus objects that are more fragile (e.g., vases). However, in the interest of not always using the same objects for authentication, there may still be a non-zero weight set for "vase." Similarly, the type of action to apply may be in accordance with a LRU weighting, which may be specific to the user 140, the type of object associated with the task being selected, user/object pairing, etc. In one example, for some types of actions, the task selection logic may have an associated randomization factor and a maximum-minimum range. For instance, for "moving" an object, the maximum-minimum range may be 2 feet to 15 feet, and the server(s) 125 may select a distance for the user 140 to move the object somewhere between 2 feet and 15 feet, e.g., randomly selected. Similarly, the task selection logic may include rules that cause server(s) 125 to select between tasks associated with network-connected devices, tasks associated with non-network connected devices (e.g., non-networked lights/lighting systems), and/or other non-networked objects. In one example, the task selection logic may include different weighting and preferences for different types of entities requesting user authentications or specific requesting entities. These and other aspects of the present disclosure are discussed in greater detail below in connection with the examples of FIGS. 2 and 3.

The foregoing illustrates just one example of a system in which examples of the present disclosure for authenticating a user for a network-based transaction by determining from sensor data from at least one network-connected sensor device at a physical location a change in a set of environmental conditions of the physical location indicative that the user performed at least one action in accordance with an instruction may operate. In addition, the foregoing is described in connection with just one example environment 190. However, it will be appreciated that environmental-based authentication of users for network-based transactions may be facilitated in various other environments having different network connected devices, non-networked objects, and so forth via the system 100.

In addition, network connected sensor devices 160 and user device 111 and/or biometric sensor(s) 112 may also perform local proximity sensing with one another such as via IEEE 802.15 communications, 802.11 communications (e.g., Wi-Fi Direct), etc., or other NFC and/or RFID-based scanning (e.g., per International Organization for Standardization (ISO)/International Electrical Commission (IEC) 18000, 18092, 18185, 21481, or the like). For instance, a location of user 140 as reported by user device 111 and/or from another network-based source may be verified by additional detection of user device 111 and/or biometric sensor(s) 112 via local sensing by one or more of network connected device 160, access point 185, or the like.

In one example, aspects described above with regard to one or more of network based devices 160 may alternatively or additionally be performed or provided by user device 111 and/or biometric sensor(s) 112. For example, objects in the environment 190/at the physical location 195 may alternatively or additionally be detected from images/video obtained via a camera of user device 111. In addition, in one example, the completion of the task/action may also be verified via user device 111 and/or biometric sensor(s) 112 (e.g., from sensor data thereof). For instance, user 140 may verify task completion of moving rolling suitcase 159 eight feet to the left by capturing image(s) or video from a camera of user device 111 and uploading to the server(s) 125 for analysis and confirmation. In still another example, server(s) 114 may perform any of the steps, functions, and/or operations described above in connection with server(s) 125. For instance, an entity engaging in a network-based transaction associated with user 140 may participate in the transaction, in addition to performing an authentication process as described herein. In other words, in one example, the authentication process is not necessarily performed by a third party as a service to others but may be performed by an entity that also participates in the network-based transaction.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 113, and vice versa. In addition, although server(s) 113 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for authenticating a user for a network-based transaction by determining from sensor data from at least one network-connected sensor device at a physical location a change in a set of environmental conditions of the physical location indicative that the user performed at least one action in accordance with an instruction. Additionally, devices that are illustrated and/or described as using one form of communication (such as a cellular or non-cellular wireless communications, wired communications, etc.) may alternatively or additionally utilize one or more other forms of communication.

To aid in understanding the present disclosure, FIG. 2 illustrates examples of a user record 210 and an environment map 220 in accordance with the present disclosure. For example, user record 210 may be stored in a user database, such as user database 126 of FIG. 1. As illustrated in FIG. 2, user record 210 includes field of various information pertaining to a user, such as user 140 of FIG. 1. For instance, user record 210 may include a user name field, a user identifying data field, a phone address field, a smartwatch address field, and a current/last location field. The user identifying data may be a username, e.g., to register with an authentication service, a telecommunication network service, etc. In one example, the phone address may be a phone number, an IMSI, IMEI, or the like, and similarly for the smartwatch address. In one example, the phone address and/or the smartwatch address may each respectively comprise an IP address, or the like. In one example, the user record 210 may include a current/last location of the user. However, in another example, this field may be excluded and the current/last detectable location of the user may be determined in response to an authentication request.

Referring now to the example environment map 220, the environment map may include physical location information, e.g., a current location of a user in connection with an authentication request. The physical location information may include a latitude, longitude, altitude, and so forth. The environment 220 may further include additional environmental conditions as determined by one or more network-connected sensor devices, such as a temperature, whether other people are detected nearby, images of the environment such as from a security camera and/or a camera of the user's smartphone, etc. The environment map may further include a list of available network connected devices at the location/in the environment. In addition, in accordance with the present disclosure, the environment map may also include a list of non-network connected objects, e.g., a tree, rolling suitcase, pumpkin etc. As noted above, an authentication system/server may utilize the environment map to determine one or more tasks/actions to command the user to perform in connection with an authentication request. It should be noted that the examples of FIG. 2 are just two examples of how a user record and environment map may be organized, and the types of information these records may include in accordance with the present disclosure. For example, instead of a dedicated field for user smartwatch data, a more general field may be provided for any secondary communication devices of the user, in which the type(s) of device(s) may be identified the types of data available via such device(s) may be listed, and so forth. In another example, the list of network connected devices may include status information of these devices (e.g., whether such devices currently available for providing data in connection with authentication requests (or not), the current settings of such devices, and so forth).

FIG. 3 illustrates a flowchart of an example method 300 for authenticating a user for a network-based transaction by determining from sensor data from at least one network-connected sensor device at a physical location a change in a set of environmental conditions of the physical location indicative that the user performed at least one action in accordance with an instruction, in accordance with the present disclosure. In one example, the method 300 is performed by a component of the system 100 of FIG. 1, such as by server(s) 125, and/or any one or more components thereof (e.g., a processor, or processors, performing operations stored in and loaded from a memory), or by server(s) 125, server(s) 113, or the like in conjunction with one or more other devices, such as user device 111, biometric sensor(s) 112, server(s) 114, network connected sensor devices 160, and so forth. In one example, the steps, functions, or operations of method 300 may be performed by a computing device or processing system, such as computing system 400 and/or hardware processor element 402 as described in connection with FIG. 4 below. For instance, the computing system 400 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and may proceed to optional step 310 or to step 315.

In optional step 310, the processing system may obtain, from a computing system associated with the network-based transaction, a request to authenticate a user associated with the network-based transaction. The user may be attempting to complete or proceed with a network-based transaction, or the authentication of the user may be requested for a network-based transaction of another person or entity for which the authorization/permission of the user is required. The computing system from which the request is received may be an online merchant, a server of an online banking system, a server of a credit card issuer, and so forth. In other words, the network-based transaction may comprise accessing a network, accessing a website, completing an online purchase, etc. It should be noted that the network-based transaction is not associated with the physical location (e.g., the network-based transaction does not involve a physical access provided via any of the at least one network-connected sensor devices at the physical location). As noted above, the authentication of the user may be to approve a network-based transaction for another user or an entity (which could be accessing a network, accessing a website, completing an online purchase, etc., but could also be permitting a physical access that is facilitated via a network-based authentication process (for the other user to access another location that is different from the physical location at which the user is being authenticated to approve the transaction for the other user)).

In step 315, the processing system detects a physical location of a user via at least one mobile computing device of the user, where the user is to be authenticated for a network-based transaction. For instance, step 315 may be performed in response to a request that may be received at optional step 310. The location of the mobile computing device (or "user device") may be determined in any number of ways, such as discussed above (e.g., by querying the mobile computing device, by querying for a telecommunication network location record, etc.).

In step 320, the processing system identifies at least one network-connected sensor device at the physical location of the user. For instance, the at least one network-connected sensor device may comprise a camera, a microphone, a thermostat, a motion sensor, a light sensor, and so forth. In one example, the at least one network-connected sensor device may be deployed in a vehicle (e.g., a drone, autonomous vehicle, or vehicle capable of autonomous operation and in an autonomous operation mode, and/or a remotely controllable vehicle, e.g., controllable by the processing system to move to a particular position to capture sensor data, etc.).

In step 325, the processing system determines, from the at least one network-connected sensor device, a set of environmental conditions (broadly one or more environmental conditions) of an environment of the physical location. In one example, the set of environmental conditions (i.e., at least one environmental condition) may include the presence of the at least one network-connected sensor device or whether it is currently available for use. In one example, the set of environmental conditions may further include one or more sensor readings from the at least one network-connected sensor device, such as a temperature, humidity, images from a camera, sounds or sound levels from a microphone, or the like). Alternatively, or in addition, the set of environmental conditions may include device statuses/settings, such as a door open/closed status, a lighting system on/off status, and/or a light level, a fan on/off status and/or a fan speed setting, etc. In one example, the at least one network-connected sensor device may comprise a camera, and the determining the set of environmental conditions at step 325 may comprise identifying a non-networked object in at least one image obtained via the camera. For instance, the non-networked object may comprise at least one component of an electronic apparatus, such as a lighting system, a fan, or an appliance.

In step 330, the processing system identifies at least one action for the user to perform at the physical location to interact with at least one aspect of the environment in accordance with the set of environmental conditions. For instance, in one example, the at least one action may be to change one or more aspects of the set of environmental conditions (e.g., to change at least one condition thereof) and/or to cause such a change in the set of environmental conditions. To illustrate, in one example, the at least one aspect of the environment may comprise the at least one network-connected sensor device. In such case, the at least one action may comprise changing a setting of the at least one network-connected sensor device. For instance, some sensor devices may be controllable (e.g., a thermostat), while others can just sense the environment, but cannot necessarily control/change aspects of the environment (e.g., a microphone). In one example, the at least one aspect of the environment may comprise a non-networked object. In such case, the at least one action may comprise for example, touching the non-networked object, moving the non-networked object, or the like. In another example, the at least one action may comprise moving toward or away from the non-networked object, gesturing toward or away from the non-networked object, and so forth. It should be noted that the non-networked object may comprise a non-networked electronic device or system, such as a non-networked lighting system, fan, or other appliances. For instance, the user may be instructed to turn a fan on or off, which may be detected via camera images, instructed to turn a vacuum cleaner on, which may be detected from a microphone and/or camera images, etc.

In step 335, the processing system transmits an instruction to the user to perform the at least one action. For instance, the instruction may be transmitted to at least one mobile computing device of the user. Alternatively, or in addition, the instruction may be transmitted to the at least one network-connected sensor device for presentation to the user (e.g., via a display screen, a speaker, etc.).

In step 340, the processing system obtains sensor data from the at least one network-connected sensor device. For instance, the processing system may establish communication(s) with the at least one network-connected sensor device over one or more networks and may obtain such sensor data via a request to the at least one network-connected sensor device, or by the at least one network-connected sensor device automatically forwarding the sensor data.

In step 345, the processing system determines, from the sensor data, whether the user performed the at least one action. For instance, step 345 may include detecting a change in the set of environmental conditions indicative that the user performed the at least one action. For example, if the user is instructed to turn a thermostat up two degrees, step 345 may include determining from the sensor data that the temperature setting on a thermostat has been increased by two degrees as compared to the temperature setting as indicated by the sensor data prior to the instruction (e.g., part of the set of environmental conditions determined at step 325). For instance, step 345 may include obtaining sensor data comprising status information from the network-connected device. If the user is instructed to turn a non-networked appliance on and off again, the action may be detected via images obtained via a camera and/or via sound signal obtained via a microphone, and so forth.

In optional step 350, the processing system may obtain biometric data of the user from the at least one mobile computing device of the user, such as pulse/heart rate data, gyroscope, compass, and/or accelerometer data, and so forth.

In optional step 355, the processing system may determine that the biometric data is consistent with the at least one action. For instance, if the user is instructed to perform an action such as increasing some level of physical activities, e.g., jumping jacks or running in place, it is expected that the user's pulse/heart rate will increase, which may be detectable from the biometric data. Similarly, the gyroscope, compass, and/or accelerometer data may be indicative that the user is performing a particular type of movement. For instance, as noted above, different actions/movements may have different detection models (e.g., MLAs) that may be implemented by the processing system to detect from such biometric data which types of movement(s) the user is engaged in. However, if the user does not perform the instructed at least one action, then step 355 may return a negative confirmation (e.g., transmitting a negative result to a requesting entity indicating a failure of the user being authenticated) that the user has failed to complete the instructed at least one action and step 360 is skipped.

In step 360, the processing system authenticates the user for the network-based transaction in response to determining from the sensor data that the user has performed or completed the instructed at least one action. In one example, the authenticating is further in response to determining at optional step 355 that the biometric data is consistent with the at least one action. In one example, step 360 may comprise transmitting a result to a requesting entity and/or to the user being authenticated.

Following step 360, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-360, for additional transactions, for other users, and so forth. In addition, the method 300 may be expanded or otherwise modified to include any other aspects of the present disclosure as described herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components or devices illustrated in FIG. 1, or described in connection with FIGS. 2-3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for authenticating a user for a network-based transaction by determining from sensor data from at least one network-connected sensor device at a physical location a change in a set of environmental conditions of the physical location indicative that the user performed at least one action in accordance with an instruction, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for authenticating a user for a network-based transaction by determining from sensor data from at least one network-connected sensor device at a physical location a change in a set of environmental conditions of the physical location indicative that the user performed at least one action in accordance with an instruction (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for authenticating a user for a network-based transaction by determining from sensor data from at least one network-connected sensor device at a physical location a change in a set of environmental conditions of the physical location indicative that the user performed at least one action in accordance with an instruction (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    detecting, by a processing system including at least one processor, a physical location of a user via at least one mobile computing device of the user, wherein the user is to be authenticated for a network-based transaction;
    identifying, by the processing system, at least one network-connected sensor device at the physical location of the user;
    determining, by the processing system from the at least one network-connected sensor device, a set of environmental conditions of an environment of the physical location;
    identifying, by the processing system, at least one action for the user to perform at the physical location to interact with at least one aspect of the environment in accordance with the set of environmental conditions;
    transmitting, by the processing system, an instruction to the user to perform the at least one action;
    obtaining, by the processing system, sensor data from the at least one network-connected sensor device;
    determining, by the processing system from the sensor data, that the user performed the at least one action;
    obtaining biometric data of the user captured by at least one non-audiovisual biometric sensor;
    determining that the biometric data is consistent with the at least one action; and
    authenticating, by the processing system, the user for the network-based transaction in response to the determining from the sensor data that the user performed the at least one action, wherein the authenticating is further in response to determining that the biometric data is consistent with the at least one action.

2. The method of claim 1, wherein the at least one aspect of the environment comprises the at least one network-connected sensor device.

3. The method of claim 2, wherein the at least one action comprises changing a setting of the at least one network-connected sensor device.

4. The method of claim 1, wherein the at least one aspect of the environment comprises a non-networked object.

5. The method of claim 4, wherein the at least one action comprises at least one of:
    touching the non-networked object; or
    moving the non-networked object.

6. The method of claim 4, wherein the at least one network-connected sensor device comprises a camera.

7. The method of claim 6, wherein the determining the set of environmental conditions comprises identifying the non-networked object in at least one image obtained via the camera.

8. The method of claim 4, wherein the non-networked object comprises at least one component of an electronic apparatus.

9. The method of claim 8, wherein the electronic apparatus comprises:
    a lighting system;
    a fan; or
    an appliance.

10. The method of claim 1,
    wherein the biometric data is obtained from the at least one mobile computing device of the user.

11. The method of claim 1, further comprising:
    obtaining a request to authenticate the user from a computing system associated with the network-based transaction.

12. The method of claim 1, wherein the at least one network-connected sensor device comprises a camera.

13. The method of claim 1, wherein the at least one network-connected sensor device comprises at least one of:
    a microphone;
    a thermostat;
    a motion sensor; or
    a light sensor.

14. The method of claim 1, wherein the at least one network-connected sensor device is deployed in a vehicle.

15. The method of claim 1, wherein the network-based transaction is not associated with the physical location.

16. The method of claim 1, wherein network-based transaction comprises one of:
    accessing a network;
    accessing a website; or
    completing an online purchase.

17. The method of claim 1, wherein the user is to be authenticated to approve a network-based transaction for another user or an entity.

18. A non-transitory computer-readable medium storing instructions that, when executed by a processing system including at least one processor, cause the processing system to perform operations, the operations comprising:
    detecting a physical location of a user via at least one mobile computing device of the user, wherein the user is to be authenticated for a network-based transaction;
    identifying at least one network-connected sensor device at the physical location of the user;
    determining, from the at least one network-connected sensor device, a set of environmental conditions of an environment of the physical location;
    identifying at least one action for the user to perform at the physical location to interact with at least one aspect of the environment in accordance with the set of environmental conditions;

transmitting an instruction to the user to perform the at least one action;
obtaining sensor data from the at least one network-connected sensor device;
determining, from the sensor data, that the user performed the at least one action;
obtaining biometric data of the user captured by at least one non-audiovisual biometric sensor;
determining that the biometric data is consistent with the at least one action; and
authenticating the user for the network-based transaction in response to the determining from the sensor data that the user performed the at least one action, wherein the authenticating is further in response to determining that the biometric data is consistent with the at least one action.

19. An apparatus comprising:
a processing system including at least one processor; and
a non-transitory computer-readable medium storing instructions that, when executed by the processing system, cause the processing system to perform operations, the operations comprising:
  detecting a physical location of a user via at least one mobile computing device of the user, wherein the user is to be authenticated for a network-based transaction;
  identifying at least one network-connected sensor device at the physical location of the user;
  determining, from the at least one network-connected sensor device, a set of environmental conditions of an environment of the physical location;
  identifying at least one action for the user to perform at the physical location to interact with at least one aspect of the environment in accordance with the set of environmental conditions;
  transmitting an instruction to the user to perform the at least one action;
  obtaining sensor data from the at least one network-connected sensor device;
  determining, from the sensor data, that the user performed the at least one action;
  obtaining biometric data of the user captured by at least one non-audiovisual biometric sensor;
  determining that the biometric data is consistent with the at least one action; and
  authenticating the user for the network-based transaction in response to the determining from the sensor data that the user performed the at least one action, wherein the authenticating is further in response to determining that the biometric data is consistent with the at least one action.

20. The apparatus of claim 19, wherein the at least one aspect of the environment comprises the at least one network-connected sensor device.

* * * * *